United States Patent
Tauman et al.

[11] 3,808,686
[45] May 7, 1974

[54] HYDROPHILIC COATING FOR DENTAL PROSTHESES

[75] Inventors: Harvey Tauman, Tappan; Isadore T. Sklover, Queens Village; Irving Tauman, Bronx, all of N.Y.; Charles K. Kliment, Princeton, N.J.

[73] Assignee: Hydro-Dent Corporation, New York, N.Y.

[22] Filed: June 28, 1971

[21] Appl. No.: 157,579

[52] U.S. Cl. .................................................. 32/2
[51] Int. Cl. ........................................ A61c 13/00
[58] Field of Search ...................................... 32/2

[56] References Cited
UNITED STATES PATENTS 3,618,213  11/1971  Shepherd et al. ................ 32/2
3,516,424  6/1970   Eagle .............................. 132/148

*Primary Examiner*—Robert Peshock
*Attorney, Agent, or Firm*—Cushman, Darby & Cushman

[57] ABSTRACT

Denture breath is eliminated from removable dental prostheses, e.g. dentures or orthodontic appliances by applying to the dental prostheses a solution of a water insoluble, organic solvent soluble hydrophilic polymer containing a flavoring agent; preferably the solution is applied as an aerosol. The polymers are preferably hydroxy lower alkyl acrylate or methacrylate polymers. Saccharin can be employed in the formulation to eliminate an initial burning sensation.

Dentures can be cleaned by applying to them a solution of the same type of polymer having a bacteriostatic agent or disinfectant in the formulation.

13 Claims, 3 Drawing Figures

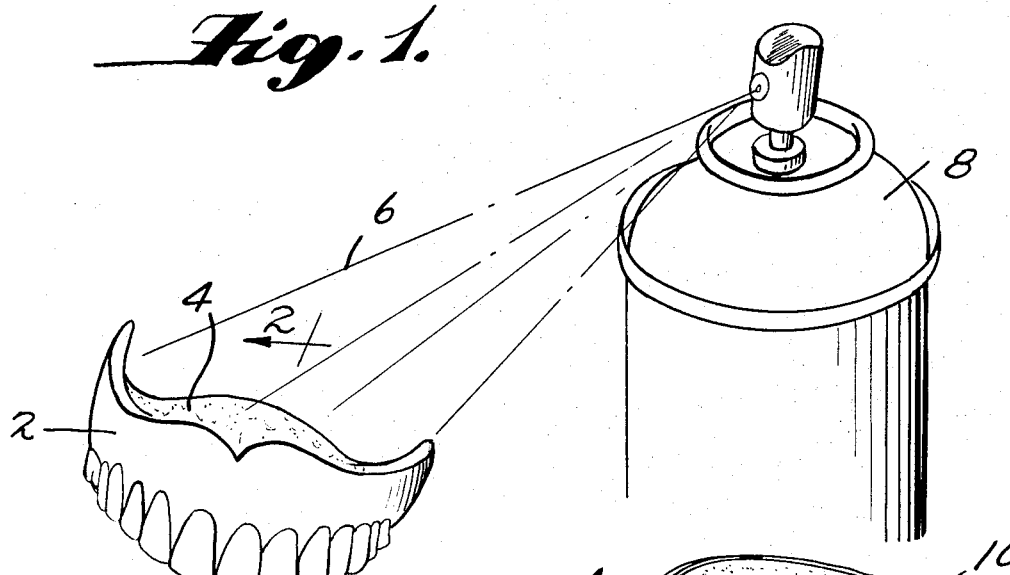
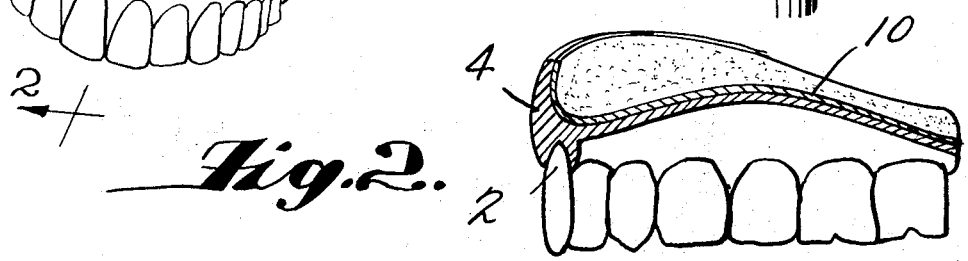
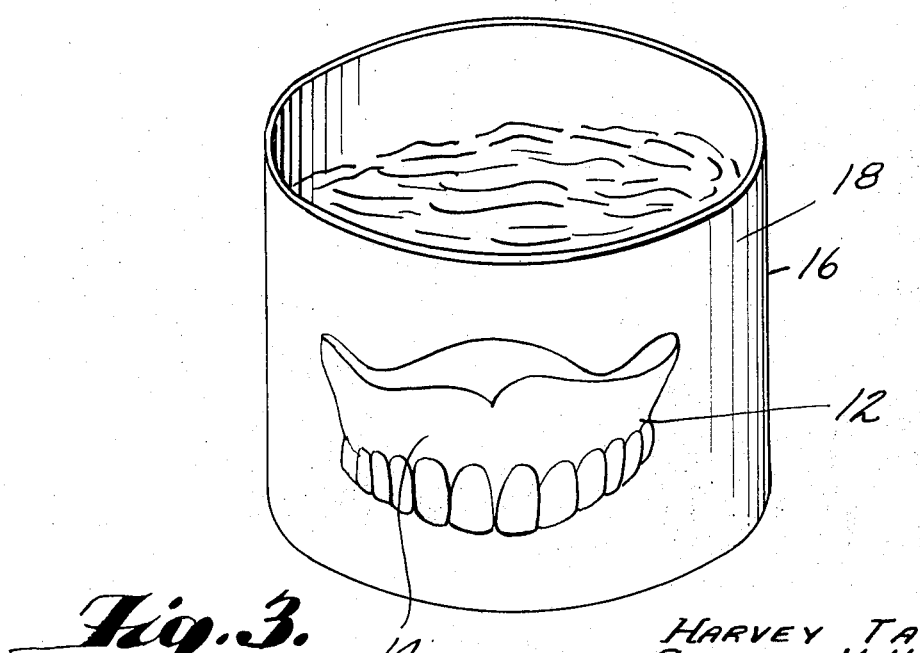

HYDROPHILIC COATING FOR DENTAL PROSTHESES

The present invention relates to the treatment of dentures and removable denture prostheses.

A grave problem with dentures today is that they give off unpleasant odors, the so-called denture breath. Additionally there is a problem in cleaning dentures after use.

It is an object of the present invention to eliminate denture breath.

Another object is to simplify the cleaning of dentures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying an organic solution of a water insoluble, organic solvent soluble hydrophilic polymer to full or partial dentures or other removable denture prostheses, e.g. orthodontic appliances such as orthodonic retainers. To eliminate denture breath there is included in the formulation a flavoring agent in the formulation. Preferably the formulation is applied as an aerosol but it can be applied by painting or by spraying.

Preferably there is employed sufficient flavoring agent to last 10–12 hours although the range of time can be from 0.5 to 24 hours.

It is only necessary to apply sufficient of the solution to just wet the surfaces of the denture, e.g. the inside of the denture, or other dental prosthesis, although there can be applied more to build up a coating thickness of 1 or 2 mils, for example. The solvent evaporates leaving a thin film of the dry hydrophilic polymer having the flavoring agent entrapped therein. The moisture present in the breath wets the denture coating sufficiently to release the flavor. The flavor is released slowly over any desired predetermined period of time. The rate of release can be readily controlled by adjusting the proportions of hydrophilic monomer and hydrophobic monomer (e.g. alkyl acrylate or methacrylate) in the polymer.

The hydrophilic monomer used to prepare the hydrophilic polymer is preferably a hydroxyalkyl monoacrylate or methacrylate such as 2-hydroxyethyl acrylate, 2-hydroxyethyl methacrylate, diethylene glycol monoacrylate, diethylene glycol monomethacrylate, hydroxypropyl acrylates and methacrylates, e.g. 2-hydroxypropyl acrylate, 2-hydroxypropyl methacrylate, 3-hydroxypropyl acrylate, 3-hydroxypropyl methacrylate, tetraethylene glycol monomethacrylate, pentaethylene glycol monomethacrylate, dipropylene glycol monomethacrylate, dipropylene glycol monoacrylate. Acrylamide, methacrylamide, diacetone acrylamide, methylolacrylamide and methylol methacrylamide also are useful hydrophylic monomers. The most preferred monomer is 2-hydroxyethyl methacrylate and the next most preferred monomer is 2-hydroxyethyl acrylate.

In preparing hydroxyalkyl acrylates and methacrylates a small amount of the diacrylate or dimethacrylate is also formed. This need not be removed as it does not cause undue cross-linking.

In addition to the polymers set forth supra, it has also been found that compositions can be prepared from other hydrophilic copolymers, the term copolymers being employed generically to cover polymers of 2, 3, 4 or more reactants. Such copolymers include copolymers of hydroxyalkyl monoacrylates or methacrylates of the type set forth supra, e.g. hydroxyethyl acrylate, hydroxyethyl methacrylate, hydroxypropyl acrylate or hydroxypropyl methacrylate with 1 to 50 percent, preferably 5 to 25 percent of lower alkyl acrylates and methacrylates such as methyl acrylate, ethyl acrylate, propyl acrylate, isopropyl acrylate, butyl acrylate, sec. butyl acrylate, methyl methacrylate, ethyl methacrylate, propyl methacrylate, isopropyl methacrylate, butyl methacrylate and sec. butyl methacrylate.

Other suitable copolymers include copolymers of the hydroxyalkyl acrylates or methacrylates as set forth supra with 1 to 60 percent, preferably 5 to 25 percent of lower alkoxy lower alkyl acrylates and methacrylates where the lower alkyl has at least 2 carbon atoms, e.g. methoxyethyl acrylate, ethoxyethyl acrylate, propoxyethyl acrylate, butoxyethyl acrylate, methoxypropyl acrylate, methoxybutyl acrylate, methoxyethyl methacrylate, ethoxyethyl methacrylate, propoxyethyl methacrylate, butoxyethyl methacrylate, ethoxypropyl methacrylate. Preferably methoxyethyl and ethoxy ethyl acrylates are employed.

There can also be employed copolymers of the hydroxyalkyl acrylates and methacrylates as set forth supra with 0.1 to 25 percent usually at least 1 percent and preferably 5 to 15 percent of ethylenically unsaturated amines.

As the ethylenically unsaturated amine there can be used p-aminostyrene, o-aminostyrene, 2-amino-4-vinyltoluene, alkylamino alkyl acrylates and methacrylates, e.g. diethylaminoethyl acrylate, diethylaminoethyl methacrylate, dimethylaminoethyl acrylate, dimethylaminoethyl methacrylate, t-butylaminoethyl acrylate, t-butylaminoethyl methacrylate, piperidinoethyl acrylate, piperidinoethyl methacrylate, morpholinoethyl acrylate, morpholinoethyl methacrylate, 2-vinylpyridine, 3-vinyl pyridine, 4-vinyl pyridine, 2-ethyl-5-vinylpyridine, dimethylamino propyl acrylate, dimethylamino propyl methacrylate, dipropylaminoethyl acrylate, dipropylaminoethyl methacrylate, di-n-butylaminoethyl acrylate, di-n-butylaminoethyl methacrylate, di-sec. butylaminoethyl acrylate, di-sec. butylaminoethyl methacrylate, dimethylaminoethyl vinyl ether, dimethyl aminoethyl vinyl sulfide, diethylaminoethyl vinyl ether, diethylaminoethyl vinyl sulfide, aminoethyl vinyl ether, aminoethyl vinyl sulfide mono methylaminoethyl vinyl sulfide, monoethylaminoethyl vinyl ether, N-(gamma-monomethylamino) propyl acrylamide, N-(beta-monomethylamino) ethyl acrylamide, N-(beta-monomethylamino) ethyl methacrylamide, 10-aminodecyl vinyl ether, 8-aminooctyl vinyl ether, 5-aminopentyl vinyl ether, 3-aminopropyl vinyl ether, 4-aminobutyl vinyl ether, 2-aminobutyl vinyl ether, monoethylaminoethyl methacrylate, N-(3,5,5-trimethylhexyl) aminoethyl vinyl ether, N-cyclohexylaminoethyl vinyl ether, 2-(1,1,3,3-tetramethylbutylamino) ethyl methacrylate, N-t- butylaminoethyl vinyl ether, N-methylaminoethyl vinyl ether, N-2-ethylhexylaminoethyl vinyl ether, N-t-butylaminoethyl vinyl ether, N-t-octylaminoethyl vinyl ether, 2-pyrrolidinoethyl acrylate, 2-pyrrolidinoethyl methacrylate, 3-(dimethylaminoethyl)-2-hydroxypropyl acrylate, 3-(dimethylaminoethyl)-2-hydroxypropyl methacrylate, 2-aminoethyl acrylate, 2-aminoethyl methacrylate. The presently preferred amino compounds are alkylaminoethyl acrylates and methacrylates, most preferably t-butyl aminoethyl methacrylate.

Furthermore, there can be employed copolymers of the hydroxyalkyl acrylates and methacrylates as set forth supra with 0.1 to 15 percent, usually at least 1 percent and preferably 5 to 15 percent of ethylenically unsaturated carboxylic acids, e.g. acrylic acid, methacrylic acid, fumaric acid, itaconic acid, aconitic acid, cinnamic acid, crotonic acid, maleic acid, 2-hydroxyethyl itaconate, etc.

Of course, there can be used a plurality of the alkyl acrylates and/or methacrylates; alkoxyalkyl acrylates and methacrylates, etc.

Useful terpolymers include terpolymers of (1) at least 50 percent of the hydroxy alkyl acrylate or methacrylate (2) 1 to 49.9 percent of the alkyl acrylate or methacrylate and (3) 0.1 to 15 percent, preferably at least 1 percent, of the ethylenically unsaturated acid or 0.1 to 25 percent, preferably at least 1 percent, of the ethylenically unsaturated amine or terpolymers of (1) at least 50 percent hydroxyalkyl acrylate or methacrylate, (2) 1 to 49.9 percent of lower alkoxy lower alkyl acrylate or methacrylate (where the lower alkyl has at least 2 carbon atoms) and (3) 0.1 to 15 percent, preferably at least 1 percent, of the ethylenically unsaturated acid or 0.1 to 25 percent, preferably at least 1 percent, of the ethylenically unsaturated amine.

Tetrapolymers are also useful which are like the terpolymers of the preceding paragraph but which contain both the unsaturated acid and amine in the proportions specified, e.g. a tetrapolymer of 85 percent hydroxyethyl methacrylate, 5 percent ethyl acrylate, 5 percent dimethylaminoethyl acrylate and 5 percent methacrylic acid.

Additional useful polymers are terpolymers of alkoxyalkyl acrylates or methacrylates as specified above with 1 to 49.9 percent of lower alkyl acrylates or methacrylates and 0.1 to 15 percent, preferably at least 1 percent, of ethylenically unsaturated acids as specified above, particularly acrylic acid or methacrylic acid. There can also be used polymers containing vinyl pyrrolidone units in an amount of 1 to 95 percent for example, e.g. terpolymers with a hydroxyalkyl acrylate or methacrylate and an alkyl acrylate or methacrylate, e.g. 60 percent hydroxyethyl methacrylate, 20 percent vinyl pyrrolidone and 20 percent butyl acrylate.

The presently preferred polymer is a polymer of 20 percent butyl acrylate and 80 percent hydroxyethyl methacrylate. This polymer contains a small amount of ethylene glycol dimethacrylate units (about 0.3 percent) resulting from the presence of ethylene glycol dimethacrylate as an impurity in the hydroxyethyl methacrylate.

While hydroxyalkyl acrylate and methacrylate polymers are preferred, there can be employed other hydrophilic water insoluble organic solvent soluble polymers which are non-toxic. Thus there can be employed polymers of the type set forth above where the hydroxyalkyl acrylate or methacrylate is replaced by the same amount of vinyl pyrrolidone, e.g. a copolymer of 80 percent vinyl pyrrolidone and 20 percent butyl acrylate, polyvinyl alcohol modified e.g. by having sufficient vinyl acetate units to be water insoluble but still hydrophilic. A copolymer of hydroxyethyl methacrylate with vinyl pyrrolidone (e.g. 70:30, 65:35, 35:65 or 30:70) is also suitable providing traces of cross-linking agent are present (e.g. about 0.1–0.3 percent) to impart water insolubility.

As the organic solvent, there can be employed any volatile solvent for the polymer. Preferably the solvent is non-toxic. Typical examples of solvents include lower alcohols, e.g. ethyl alcohol, isopropyl alcohol, propyl alcohol, ethylene glycol methyl ether, ethylene glycol ethyl ether, methyl acetate, ethyl acetate, butyl acetate, ethyl propionate, amyl acetate, and isoamyl acetate.

As the flavoring agent there can be employed any water soluble or water leachable flavoring agent, e.g. spearmint oil, peppermint oil, menthol, orange oil, methyl salicylate, etc. The flavoring agent is normally used in an amount of 0.05 to 5 percent of the composition, but this is not critical.

To prevent an initial (about 5–10 seconds) burning sensation when the denture is put in the mouth it has been found desirable to add a small amount of saccharin, e.g. 0.05 to 1 percent of the composition. The saccharin can be employed as either sodium saccharin or calcium saccharin.

The polymer is normally 0.1 to 20 percent, preferably 1 to 10 percent of the composition, the balance being the solvent (with or without a propellant depending on whether an aerosol is being employed).

When the hydrophilic polymer is packaged in an aerosol container the propellant should be sufficient to force the composition out of the container as a spray. The propellant can vary considerably, but usually is about 15 to 85 percent, preferably 25 to 35 percent, of the total composition. As the aerosol propellants there can be used compressed gases such as carbon dioxide, nitrous oxide and nitrogen, liquified volatile hydrocarbons such as propane, n-butane, isobutane, 2-methyl butane and fluorinated compounds including perhalogenated compounds and fluorinated hydrocarbons such as di-chlorodifluoromethane (Freon 12), trichlorofluoromethane, 1,2-dichlorotetrafluoroethane, octofluorocyclobutane, chlorofluoromethane, 1,1-difluoroethane, 1-chloro-1,1-difluoroethane. These fluorinated compounds are available under the names Freon and Genetron. The propellant should contain a substantial amount of volatile material boiling at not over 20° C., but there can also be present a significant amount of less volatile material boiling up to 50°C., e.g. methylene chloride can be present as a substantial part of the propellant.

The coating is normally removed daily. Thus the dentures can be wet with water and the coating removed with a brush. Alternatively the dentures can be wet with a solvent for the hydrophilic coating.

It has also been found that the hydrophilic polymer compositions can also be employed to clean dentures. The dentures can either be conventional dentures or dentures which have had a film applied to them as set forth above. The cleansing composition can be painted on the dentures or more preferably applied as an aerosol. The flavoring agent can be included or omitted.

The cleansing formulation however includes an alkali metal perborate, e.g. sodium perborate or potassium perborate or other source of nascent oxygen, e.g. sodium persulfate, potassium persulfate, ammonium persulfate in an amount of 0.5 to 10 percent, preferably about 2 percent of the formulation. Other bacteriostatic agents or disinfectants can also be included, e.g. hexachlorophene, cetyl pyridinium chloride, acetyl pyridinium bromide, trimethyl benzyl ammonium, chloride or bromide, etc. Any bacteriostatic agent that can be leached from the hydrophilic polymer can be employed.

The simplest method of applying the cleansing agent is to spray both sides of the denture at night, place the coated denture in a container of water and leave overnight. There is a slow release of the cleansing agent from its entrapment in the hydrophilic polymer coating of the denture. The time for complete release can be varied from 0.5 to 24 hours in normal operation depending on the thickness of coating applied. The rate of release can also be controlled by appropriate adjustment of monomers in the hydrophilic copolymer.

Typical aerosol formulations for application to full or partial dentures or to orthodontic retainers are set forth in Table 1. The polymer was an organic solvent soluble, water insoluble copolymer of 80 percent hydroxyethyl methacrylate (containing traces of ethylene glycol dimethacrylate as an impurity) and 20 percent of butyl acrylate.

Unless otherwise indicated, all parts and percentages are by weight.

TABLE 1

|  | A | B | C |
|---|---|---|---|
| Polymer | 4.0 | 4.0 | 4.0 |
| Ethanol | 64.6 | 64.4 | 64.4 |
| Freon 12 | 30.0 | 30.0 | 30.0 |
| Spearmint oil | 1.4 | 1.4 | 1.4 |
| Menthol | — | — | 0.4 |
| Saccharin | — | 0.2 | 0.2 |

Typical aerosol formulations of cleaning dentures are shown in Table 2. The same hydroxyethyl methacrylatebutyl acrylate copolymer was used as in Table 1.

TABLE 2

|  | A | B | C |
|---|---|---|---|
| Polymer | 4.0 | 4.0 | 4.0 |
| Ethanol | 64.0 | 62.6 | 62.1 |
| Freon 12 | 30.0 | 30.0 | 30.0 |
| Spearmint oil | — | 1.4 | 1.4 |
| Sodium borate | 2.0 | — | 2.0 |
| Potassium persulfate | — | 2.0 | — |
| Hexachlorophene | — | — | 0.5 |

The invention will be understood best in connection with the drawings wherein

FIG. 1 is a perspective view showing the application of a coating to a denture;

FIG. 2 is a sectional view along the line 2—2 of the coated denture of FIG. 1; and FIG. 3 shows cleaning a denture.

Referring more specifically to FIG. 1, there is provided a denture 2. To the inside surface 4 of the denture there is applied a spray 6 from aerosol container 8. The spray can be made of any of formulations A, B and C of Table 1.

As shown in FIG. 2, the inside surface 4 of the denture has a thin coating 10 of the dried spray. When the dentures are inserted in the mouth the moisture in the breath provides for release of the flavoring agent entrapped in the hydrophilic polymer.

As shown in FIG. 3, a denture 12 has applied to the outer surfaces 14 a thin coating of the hydrophilic polymer containing cleansing agent such as any of those set forth in Table 2 formulations A, B and C. The coating can be applied e.g. from an aerosol container such as that shown in FIG. 1 for example. The coated denture is then placed in a glass 16 containing water 18 and allowed to soak overnight.

Typical examples of making suitable hydrophilic polymers are set forth below.

EXAMPLE 1

Into a flask equipped with an agitator and a heating mantle was charged 1000 grams of silicone oil; (polydimethyl silicone) 100 grams of 2-hydroxyethyl methacrylate and 0.33 grams of iospropyl percarbonate. The flask was placed under a nitrogen atmosphere and the contents were rapidly agitated and heated to 100° C. After 15 minutes at 100° C, the polymer slurry obtained was filtered hot to isolate the polymer. The polymer powder was reslurried in 300 ml. of xylene, filtered and dried. A 98 percent yield of 2 to 5 micron particle size powder was obtained. 30 grams of the polymer were dissolved in 70 ml. of ethanol and 4.0 grams of peppermint oil added. The solution was suitable for coating dentures to prevent denture breath.

EXAMPLE 2

A denture coating composition was prepared from 1.90 parts of the poly 2-hydroxyethyl methacrylate prepared in example 1, 0.10 part of menthol and 28 parts of ethyl alcohol. This solution (50 percent of the total formulation) was packaged in a conventional aerosol pressure can container together with 45.5 parts (32 percent of the total formulation) of monofluorotrichloromethane and 24.5 parts (18 percent of the total) of methylene chloride.

EXAMPLE 3

A reactor was charged with 80 kilograms of ethyl alcohol, 15 kilograms of hydroxyethyl methacrylate, 4 kilograms of methyl methacrylate and 1 kilogram of dimethylaminoethyl methacrylate. 100 grams of t-butyl peroctoate was added, the reactor purged with nitrogen and heated to 80° C. After stirring at 80° C. for 7 hours a conversion of 98.5 percent of the monomers to polymer was achieved.

EXAMPLE 4

100 grams of the polymer solution of example 3 was diluted with 300 grams of ethyl alcohol. 100 grams of the dilute solution was placed in an aerosol can along with 100 grams of Freon-12(dichlorodifluoromethane) propellant and 0.1 gram of spearmint oil.

The formulation was sprayed on an orthodontic retainer.

EXAMPLE 5

20 parts of hydroxyethyl methacrylate containing about 0.2 percent ethylene glycol dimethacrylate, 80 parts of methanol and 0.01 parts of t-butyl peroctoate were heated at 85° C. to get about 87–90 percent conversion to the polymer. The polymer had an intrinsic viscosity of 0.37 measured in Methyl Cellosolve.

The polymer was precipitated by the addition of water and the precipitate dried and ground to form a powder. 100 parts of the powder were dissolved in 300 parts of ethyl alcohol and placed in an aerosol can together with 30 parts of methylene chloride and 70 parts of Freon 12 to provide a spray for application to dentures.

EXAMPLE 6

A reactor was charged with 80 kilograms of ethanol, 17 kilograms of hydroxyethyl methacrylate, 2 kilograms of 2-ethoxyethyl methacrylate and 1 kilogram of dimethylaminoethyl methacrylate. The reactor was heated to 70°C. and 120 grams of t-butyl peroctoate was added. After purging with nitrogen, the reactor was closed, and heated to 92°C. and allowed to stir for 6 hours to achieve a conversion of 96 percent of the monomer to polymer. The reaction mixture was then cooled to room temperature. A small sample was isolated by precipitation in water. This was dried, and dissolved in ethylene glycol monomethyl ether (Methyl Cellosolve) to determine the intrinsic viscosity. A value of 0.42 was obtained.

One hundred grams of the reaction mixture solution was diluted to 400 grams with ethanol. 100 grams of the dilute solution was placed in an aerosol can along with 30 grams of methylene chloride, 70 grams of Freon-12 propellant and 0.1 gram of oil of wintergreen to provide a formulation useful as a denture spray.

EXAMPLE 7

Example 6 was repeated using a monomer charge of 17 kilograms of hydroxyethyl methacrylate, 2 kilograms of ethoxyethyl methacrylate and 1 kilogram of acrylic acid. The polymer was obtained in 92 percent conversion after 7 hours at 93°C. and had an intrinsic viscosity of 0.38 measured in Methyl Cellosolve.

EXAMPLE 8

Example 6 was repeated using a monomer charge of 15 kilograms of hydroxyethyl methacrylate, 3 kilograms of ethoxyethyl methacrylate, 1.5 kilograms of dimethylaminoethyl methacrylate, and 0.5 kilograms of methacrylic acid. The reaction was carried to 87 percent conversion after 7 hours at 92°C.

An aerosol spray was formulated in accordance with example 8.

EXAMPLE 9

A 2-liter flask, equipped with a stirrer and reflux condenser was charged with 800 grams of ethanol, 180 grams of hydroxypropyl methacrylate and 20 grams of dimethylaminoethyl methacrylate. One gram of t-butylperoctoate was added and the flask was heated at reflux for 7 hours. The polymer was isolated by precipitation in water and dried. A yield of 183 grams was obtained.

EXAMPLE 10

Example 9 was repeated using a monomer charge of 100 grams of hydroxyethyl methacrylate, 80 grams of ethoxyethyl methacrylate, and 20 grams of hydroxypropyl acrylate. The polymer, obtained in 84 percent yield was formulated into a spray in accordance with example 6.

EXAMPLE 11

Example 10 was repeated using a monomer charge of 95 grams of hydroxyethyl methacrylate, 75 grams of ethoxyethyl methacrylate, 20 grams of hydroxypropyl acrylate, and 10 grams of methacrylic acid. This polymer, obtained in 79 percent yield was formulated into a spray in accordance with example 6.

EXAMPLE 12

Using the procedure of example 6, spray formulations were made from copolymers prepared from the following monomer mixtures in the presence of about 0.4 percent t-butyl peroctoate based on the monomers and 400 parts ethanol as a solvent in accordance with the polymerization technique of example 6.

a. 98 parts hydroxyethyl methacrylate
  2 parts methacrylic acid
b. 90 parts hydroxyethyl methacrylate
  10 parts ethoxyethyl methacrylate
c. 90 parts hydroxyethyl methacrylate
  10 parts butyl acrylate methacrylate
d. 90 parts hydroxyethyl methacrylate
  10 parts methacrylic acid
e. 100 parts hydroxypropyl methacrylate
f. 90 parts hydroxyethyl methacrylate
  10 parts dimethylaminoethyl methacrylate
g. 85 parts hydroxyethyl methacrylate
  15 parts methyl methacrylate
h. 60 parts hydroxyethyl methacrylate
  40 parts butyl acrylate
i. 70 parts hydroxyethyl methacrylate
  20 parts methyl methacrylate
  10 parts methacrylic acid
j. 85 parts hydroxyethyl methacrylate
  10 parts ethoxyethyl methacrylate
  5 parts dimethylaminoethyl methacrylate
k. 70 parts hydroxyethyl methacrylate
  15 parts ethoxyethyl methacrylate
  15 parts methyl methacrylate
l. 50 parts hydroxyethyl methacrylate
  50 parts ethoxyethyl methacrylate
m. 80 parts hydroxyethyl methacrylate
  20 parts methyl acrylate

What is claimed is:

1. A removable dental prosthesis having a thin removable coating thereon of a water insoluble, solvent soluble hydrophilic polymer and having entrapped in the polymer an active agent which is slowly releasable therefrom where the polymer is moist.

2. A removable dental prosthesis according to claim 1 wherein the entrapped active agent comprises a flavoring agent.

3. A removable dental prosthesis according to claim 1 which is a full or partial denture.

4. A removable denture according to claim 3 wherein the active agent comprises a flavoring agent.

5. A removable denture according to claim 4 wherein the polymer is selected from the group consisting of hydrophilic polymers of hydroxy lower alkyl acrylates, hydroxy lower alkyl methacrylates, hydroxy lower alkoxy lower alkyl acrylates and hydroxy lower alkoxy lower alkyl methacrylates.

6. A removable denture according to claim 5 wherein the polymer is a copolymer of 80 percent hydroxyethyl methacrylate and 20 percent butyl acrylate.

7. A removable denture according to claim 4 including saccharin as a portion of the entrapped active agent.

8. A removable denture according to claim 3 including a bacteriostatic or germicidal agent as the active agent entrapped in the polymer.

9. A removable denture according to claim 8 wherein the bacteriostatic or germicidal agent is a nascent oxygen providing compound.

10. A removable denture according to claim 9 wherein the nascent oxygen providing compound is a perborate or persulfate.

11. A removable denture according to claim 10 wherein the entrapped active agent includes a flavoring agent.

12. A removable denture according to claim 8 wherein the polymer is selected from the group consisting of hydrophilic polymers of hydroxy lower alkyl acrylates, hydroxy lower alkyl methacrylates, hydroxy lower alkoxy lower alkyl acrylates and hydroxy lower alkoxy lower alkyl methacrylates.

13. A removable dental prosthesis according to claim 1 wherein the film has a thickness of up to 2 mils.

* * * * *